United States Patent [19]

Vollbracht et al.

[11] 4,308,374
[45] Dec. 29, 1981

[54] PROCESS FOR THE PREPARATION OF POLY-P-PHENYLENETEREPHTHALAMIDE

[75] Inventors: Leo Vollbracht, Arnhem; Teunis J. Veerman, Giesbeek, both of Netherlands

[73] Assignee: Akzo N.V., Arnhem, Netherlands

[21] Appl. No.: 94,589

[22] Filed: Nov. 15, 1979

Related U.S. Application Data

[63] Continuation of Ser. No. 915,585, Jun. 15, 1978, abandoned, which is a continuation of Ser. No. 658,780, Feb. 17, 1976, abandoned.

[30] Foreign Application Priority Data

Feb. 21, 1975 [NL] Netherlands .................. 7502060

[51] Int. Cl.$^3$ .................. C08G 69/28; C08G 69/32
[52] U.S. Cl. .................. 528/336; 528/348
[58] Field of Search .................. 528/336, 348

[56] References Cited

U.S. PATENT DOCUMENTS

| | | | |
|---|---|---|---|
| 3,063,966 | 11/1962 | Kwolek et al. | 528/348 |
| 3,068,188 | 12/1962 | Beste et al. | 528/348 |
| 3,232,910 | 2/1966 | Preston | 528/348 |
| 3,240,760 | 3/1966 | Preston et al. | 528/331 |
| 3,354,125 | 11/1967 | Smith et al. | 528/331 |
| 3,673,143 | 6/1972 | Bair et al. | 528/348 |
| 3,817,941 | 6/1974 | Bair et al. | 528/348 |
| 3,850,888 | 11/1974 | Fitzgerald et al. | 528/348 |
| 3,869,429 | 3/1975 | Blades | 528/348 |
| 3,966,686 | 6/1976 | Asakura et al. | 528/348 |
| 4,045,417 | 8/1977 | Yamazaki et al. | 528/348 |
| 4,075,172 | 2/1978 | Ozawa et al. | 528/348 |
| 4,169,932 | 10/1979 | Sokolov et al. | 528/336 |
| 4,172,938 | 10/1979 | Mera et al. | 528/336 |

FOREIGN PATENT DOCUMENTS

| | | |
|---|---|---|
| 49-122594 | 11/1974 | Japan. |
| 1259788 | 1/1972 | United Kingdom. |
| 1283066 | 7/1972 | United Kingdom. |

OTHER PUBLICATIONS

Chemical Abstracts, vol. 77, 1972, 20083x Chodkowski et al.
Polymer Science (USSR), Federov et al., 12, #10–12 (1970), pp. 2475–2491.
Fiber Forming Aromatic Polyamides, ManMade Fibers, vol. 2 (1968), p. 301.
Polymer Science USSR, Savinov et al., 16 (1974), pp. 2406–2411.
Chemical Marketing Reporter, Nov. 1975, pp. 3, 14.
Sowjetische Beiträge zur Faserforschung und Textiltechnik, vol. 10, May, 1973, No. 5, pp. 217–220, (English Translation by Applicants) Federov et al. II.

*Primary Examiner*—Harold D. Anderson
*Attorney, Agent, or Firm*—Stevens, Davis, Miller & Mosher

[57] ABSTRACT

A process for making poly-p-phenyleneterephthalamide having an inherent viscosity of at least 2.5 comprises reacting p-phenylene diamine with terephthaloyl chloride in a solvent which contains N-methyl pyrrolidone and at least 5% by weight of calcium chloride based on the weight of N-methyl pyrrolidone.

12 Claims, No Drawings

PROCESS FOR THE PREPARATION OF POLY-P-PHENYLENETEREPHTHALAMIDE

This is a Continuation of application Ser. No. 915,585 filed June 15, 1978, now abandoned, which in turn is a continuation of application Ser. No. 658,780, filed Feb. 17, 1976, and now abandoned.

This invention relates to a process for the preparation of poly-p-phenyleneterephthalamide having an inherent viscosity of at least 2.5 by reaction of p-phenylene diamine and terephthaloyl chloride in a solvent which contains N-methyl pyrrolidone.

A process of the type indicated above is known. The preparation of poly-p-phenyleneterephthalamide having an inherent viscosity of 2.5 or higher with the use of a mixture of hexamethylphosphoramide and N-methyl pyrrolidone in the weight ratio 1:2 is disclosed in U.S. Pat. No. 3,869,429. There are several disadvantages to the use of a mixture of hexamethylphosphoramide and N-methyl pyrrolidone. When it is applied on an industrial scale, recovery of the solvents used is necessary for reasons of economy and environmental protection. In such a recovery it is required that after the poly-p-phenyleneterephthalamide has been isolated from the reaction mixture, for which purpose it is common practice to add water or some other coagulating agent to the reaction mixture, the resulting mixture of hexamethylphosphoramide, N-methyl pyrrolidone, coagulant and the hydrochloric acid formed in the polymerization must be split up into its constituents. This procedure calls for a complex and costly regeneration system. Moreover, in such a regeneration system, the thermal and chemical instability of hexamethylphosphoramide causes losses which will cause the cost price of the poly-p-phenyleneterephthalamide produced to increase even further. Besides, there is the risk that from the hexamethylphosphoramide there will be formed the dimer which is detrimental because of its biological activity. In spite of the drawbacks to the above system, no acceptable alternative process has been proposed so far.

It is therefore an object of the present invention to provide a process for the preparation of poly-p-phenyleneterephthalamide having an inherent viscosity of at least 2.5 which process has several advantages over the processes known heretofore. A more specific object of the invention is to provide a process for the preparation of poly-p-phenyleneterephthalamide having an inherent viscosity of at least 2.5 in a reaction mixture from which the solvent can be recovered in a commercially practical manner.

The foregoing objects and others are accomplished in accordance with this invention, generally speaking, by providing a process for making poly-p-phenyleneterephthalamide having an inherent viscosity of at least 2.5 wherein p-phenylene diamine and terephthaloyl chloride are reacted in a mixture of N-methyl pyrrolidone and at least 5 percent by weight of calcium chloride.

The use of the reaction medium provided by the invention avoids the drawbacks involved in the use of hexamethylphosphoramide in the reaction mixture. The reaction mixture now found can after use be regenerated in a simple way.

It should be added that the use of mixtures of an organic solvent and a salt in the preparation of solutions of aromatic polyamides is known. For instance, according to U.S. Pat. No. 3,068,188, aromatic polyamides are dissolved in a mixture of a solvent and a salt which can split off halogen ions. Among the disclosed solvents and salts are N-methyl pyrrolidone and calcium chloride, respectively. However, the preparation of the polymers in the above-mentioned solvent-salt mixture is not disclosed, the highest value of inherent viscosity is as low as 0.98 and neither poly-p-phenyleneterephthalamide nor the combination N-methyl pyrrolidone-calcium chloride are mentioned. According to *Polymer Science U.S.S.R.* (English version, published by Pergamon Press, Oxford) Vol. 12 (1971), pages 2475–2491, poly-p-phenyleneterephthalamide is prepared in mixtures of an amide solvent and a salt. However, the maximum polymer viscosities are low and are reached at low salt concentrations. No mention is made of the system N-methyl pyrrolidone-calcium chloride.

The present invention is based on the unexpected discovery that in mixtures of N-methyl pyrrolidone and at least 5 percent by weight of calcium chloride, there can be prepared poly-p-phenyleneterephthalamide having an inherent viscosity of 2.5 or higher. Such a property is unique considering that other combinations of an organic solvent and a salt, for instance as mentioned in the above-cited literature, only yield poly-p-phenyleneterephthalamide having a low inherent viscosity.

The process according to the invention can be carried out in various ways. For instance, N-methyl pyrrolidone may be mixed with the required amount of calcium chloride, followed by adding p-phenylene diamine and, with vigorous stirring, terephthaloyl dichloride.

The resulting poly-p-phenyleneterephthalamide along with the other constituents of the reaction system for a gel-like mass. After this mass has been intimately mixed with a coagulant, such as water, the polymer can be isolated by filtration and be purified by further washing treatments.

Alternatively, the constituents of the reaction systems can be added together in a different order, for instance, by first adding the p-phenylene diamine to the N-methyl pyrrolidone and subsequently the calcium chloride. Or the reactants may be brought into the reaction medium simultaneously, for instance, by adding to the N-methyl pyrrolidone-calcium chloride system a powdered mixture of p-phenylene diamine and terephthaloyl dichloride in the required mixing ratio. Such a procedure is particularly suitable for continuous operation. Irrespective of the addition procedure selected, the reaction between the diamine and the acid chloride must always proceed in a medium of N-methyl pyrrolidone containing at least 5 percent by weight of calcium chloride.

The substances involved in the reaction should contain a minimum amount of impurities. Particularly the presence of water in an amount of more than about 0.05 percent by weight, calculated on the total reaction mixture, may result in the envisaged value of the inherent viscosity not being reached.

Therefore, the two reactants and the N-methyl pyrrolidone and the calcium chloride should be practically free from water or, in other words, substantially anhydrous. Rendering the calcium chloride free from water can be done by drying the pulverized substance in vacuum at a suitable temperature such as, for instance, 200° C. In addition to speeding up the drying process the pulverized calcium chloride has the advantage that it can be rapidly and effectively dispersed in the N-methyl pyrrolidone.

The amount of calcium chloride used in the process according to the invention, which is at least 5 percent by weight, calculated on the weight of N-methyl pyrrolidone, is dependent on the concentration of the poly-p-phenyleneterephthalamide to be prepared and the inherent viscosity envisaged. The most favorable results, namely the highest values for the inherent viscosity, are reached when use is made of a mixture made up of N-methyl pyrrolidone and 8 to 24 percent by weight of calcium chloride.

At the reaction temperatures used the calcium chloride is soluble in N-methyl pyrrolidone only to a limited extent, viz. approximately 6% by weight at 20° C. In the mixture used in the process according to the invention the calcium chloride will therefore generally occur partially in the dissolved and partially in the suspended state. It is surprising that the highest values of the inherent viscosity are obtained just when part of the calcium chloride is in its solid phase at the beginning of the reaction. By adding the reactants the calcium chloride will partly or entirely pass from the suspended into the dissolved state. Partly in view of this transition it is desirable that the calcium chloride be in a finely divided state when it is added to the N-methyl pyrrolidone. If the preferred range of 8-24 percent by weight of calcium chloride is adhered to, then there will always be solid calcium chloride in the reaction system at the beginning of the reaction.

The concentration of the poly-p-phenyleneterephthalamide to be prepared can be varied between certain limits. For reasons of economy it is unattractive to use low concentrations, which, moreover, lead to low values of the inherent viscosity. Very high concentrations do not lead to a sufficiently high value of the inherent viscosity either. It is preferred that amounts of the two reactants are so chosen that at the end of the reaction the poly-p-phenyleneterephthalamide is present in an amount of 7 to 20 percent by weight, calculated on the N-methyl pyrrolidone. Particularly favorable results are obtained with polymer concentrations in the range of 8 to 12 percent by weight.

With a view to obtaining high viscosity values it is preferred that the amount of calcium chloride used and the amount of polyamide to be prepared should be adapted to each other, which should be done in such a way that the amount by weight of the calcium chloride used is at least equal to the amount by weight of the poly-p-phenyleneterephthalamide formed.

The p-phenylene diamine and the terephthaloyl dichloride are used in equivalent amounts or either of them slightly in excess relative to the other. Also chain growth controlled substances and other usual additives may be employed. In addition to the N-methyl pyrrolidone a small amount, for instance, 10% by weight or less of a different solvent, such as dimethylacetamide may be present in the reaction system. The use of such an additional solvent, however, generally does not give any special advantages.

The addition to the reaction mixture according to the invention of substances which are specially known as acid-binding agents for use at low temperature polymerizations in a solvent, for instance, calcium oxide, pyridine, N-methyl morpholine, triethylamine, N-methylaniline, usually results in the inherent viscosity of the resulting poly-p-phenyleneterephthalamide being lower than if no such substances are added. It has been found, however, that the addition of N,N-dimethylaniline has a viscosity increasing effect and, moreover, causes the reaction to proceed faster. The N,N-dimethylaniline may be used in an amount of 5–25 percent by weight, calculated on the N-methyl pyrrolidone, but preferably in an amount which is at least equivalent to the amount of hydrochloric acid formed in the reaction.

In carrying out the process according to the invention, it is necessary that the reaction mixture should be vigorously mixed, especially in those phases of the preparation in which the p-phenylene diamine and the terephthaloyl dichloride react with each other. The desired high inherent viscosity may not be obtained with poor mixing. The mixing should be done both during the bringing together of the reactants and afterwards, until the poly-p-phenyleneterephthalamide has reached its final degree of polymerization. The mixing may be carried out with the use of a Waring Blender having a speed of 10,000 revolutions per minute or higher. Also other mixers may be used, provided that they are sufficiently effective. The mixer employed should, of course, be adequate for the scale of the operation and procedure. If the process according to the invention is to be carried out in a continuous operation, the mixing may take place by injecting the reactants sequentially or simultaneously into a turbulent stream of the reaction medium.

The process according to the invention may be carried out at temperatures below 70° C. Immediately after the reactants have been rapidly brought together, a steep rise in temperature may be observed followed by a gradual increase in temperature caused by the mechanical energy of the stirrer. During the polymerization reaction the viscosity of the reaction mixture increases at a rate which is dependent on the initial temperature. This initial temperature must be so chosen that the reactants can be properly mixed before the mixture becomes too viscous. Preferably, the process is carried out so that the temperature of the reaction mixture is in the range of 0° to 40° C. This is achieved by cooling before, during and/or after the reaction. Also, temperatures below 0° C. may be used.

The actual polymerization reaction proceeds fast and is usually completed within 15 minutes. The reactants should be added together as quickly as possible, for instance, in 10 to 20 seconds, after which the mixing is continued until the inherent viscosity has reached its end-value. Stirring may be prolonged, if required, in order that the reaction product which is normally formed into a gel-like mass, is broken up into a particle size suitable for coagulation.

The poly-p-phenyleneterephthalamide must subsequently be isolated from the reaction mixture. This can be done by first intimately mixing the reaction mixture with water or aqueous alkali, in, for instance, a Waring Blender. From the resulting suspension the poly-p-phenyleneterephthalamide is filtered off or centrifuged, purified by water and dried.

From the filtrate composed of N-methyl pyrrolidone, calcium chloride, water and the hydrochloric acid formed in the reaction N-methyl pyrrolidone and calcium chloride can be recovered. To this end, for instance, the hydrochloric acid may be converted into calcium chloride with the aid of calcium hydroxide, and the water distilled off. After separation or not, entirely or partial, into its constituents, the remaining mixture can be used again.

The inherent viscosity $\eta_{inh}$ of the poly-p-phenyleneterephthalamide is defined as $\eta_{inh} = (\ln \eta_{rel}/0.5)$ where $\eta_{rel}$ is the ratio of the efflux times of a polymer solution (0.5 g of poly-p-phenyleneterephthalamide in 100 ml of 96 percent by weight—sulphuric acid) and the pure solvent, measured in a capillary viscometer at 25° C.

The poly-p-phenyleneterephthalamide prepared by the process according to the invention is suitable for use as a starting material for the manufacture of shaped products, more particularly films, yarns and fibers having a high strength and high initial modulus. This manufacture can be done by the usual methods. Yarns and fibers can be made for instance by the spinning of solutions of the polymer in concentrated sulphuric acid. The yarns and fibers thus obtained are excellently suitable to be used as reinforcing material in rubber objects, for instance in tires for motor vehicles.

The invention is further described in the following examples. Unless otherwise indicated, all percentages by weight mentioned therein, of both calcium chloride and poly-p-phenyleneterephthalamide, are based on the weight of N-methyl pyrrolidone.

EXAMPLE I

Into a Waring Blender with a 1-1 mixing beaker and provided with a cooled bottom connected to a cryostat, there were introduced 24 g of finely ground and dried calcium chloride suspended in 200 g of N-methyl pyrrolidone (12 percent by weight calcium chloride).

The calcium chloride was partially present in the solid state. To this suspension were added, with stirring, 7.3 g of powdered p-phenylene diamine. The resulting mixture was cooled to 0° C. Subsequently, with continued cooling and vigorous stirring 13.9 g of molten terephthaloyl dichloride were rapidly added.

Stirring was continued for 30 minutes. The temperature rose to about 30° C. A crumbled mass was formed. It contained 16 g of poly-p-phenyleneterephthalamide (8 percent by weight). After water had been added, the mass was vigorously stirred to form a suspension. After filtration, washing and drying, poly-p-phenyleneterephthalamide with an inherent viscosity of 4.02 was obtained.

EXAMPLE II

The same procedure was used as described in Example I. The reaction was carried out in a mixture of 200 ml of N-methyl pyrrolidone and 36 g of calcium chloride (18 percent by weight). As reactants were used 11.0 g (1.02 moles) of p-phenylene diamine and 20.7 g (1.02 moles) of terephthaloyl dichloride. There were formed 24 g of poly-p-phenyleneterephthalamide (12 percent by weight) with an inherent viscosity of 4.05.

EXAMPLE III

In this example the influence of the calcium chloride on the inherent viscosity of the poly-p-phenyleneterephthalamide formed is elucidated.

The same procedure was used as described in Example I. The concentration of the calcium chloride was varied and the concentration of the poly-p-phenyleneterephthalamide at the end of the reaction was always 8 percent by weight. The results are listed in Table I.

In the runs IIId through IIIk solid calcium chloride was present at the start of the reaction.

TABLE I

| Run No. | Percent by weight calcium chloride | η inh |
|---|---|---|
| IIIa | 0 | 0.30 |
| IIIb | 2 | 0.55 |
| IIIc | 4 | 1.40 |
| IIId | 6 | 3.05 |
| IIIe | 8 | 3.15 |
| IIIf | 10 | 4.05 |
| IIIg | 12 | 4.05 |
| IIIh | 14 | 5.05 |
| IIIi | 16 | 4.25 |
| IIIj | 20 | 4.60 |
| IIIk | 25 | 3.80 |

It follows from Table I that the use of percentages of calcium chloride that are outside the range of the present invention (runs IIIa, IIIb, IIIc) only result in obtaining low values of the inherent viscosity. Using the percentages within the range of the invention leads to a steep increase in inherent viscosity (compared the runs IIIc and IIId).

COMPARATIVE EXAMPLE

Compositions of poly-p-phenyleneterephthalamide were prepared in the same way as described in Example I, except that a different salt or a different solvent was used. In all cases the polymer concentration was 8 percent by weight. In the runs A through F the salt concentration was 12 percent by weight and, in the run G, 1 percent by weight. The results are summarized in Table II.

TABLE II

| Run No. | Solvent | Salt | η inh |
|---|---|---|---|
| A | N-methyl pyrrolidone | calcium bromide | 0.73 |
| B | " | calcium sulphate | 0.39 |
| C | " | magnesium chloride | 1.56 |
| D | " | ammonium chloride | 0.28 |
| E | " | lithium chloride | 0.30 |
| F | dimethylacetamide | calcium chloride | 0.62 |
| G | " | lithium chloride | 0.90 |

It follows from Table II that, if use is made of combinations of a solvent and a salt which differ from those according to the invention, only polymers having a low inherent viscosity are obtained.

EXAMPLE IV

Poly-p-phenyleneterephthalamide was prepared in accordance with Example I, the percentage by weight of polymers at the end of the reaction being 12. The mixing ratio between N-methyl pyrrolidone and calcium chloride was varied. In all cases solid calcium chloride was present in the reaction medium at the start of the reaction. The results are summarized in Table III.

TABLE III

| Run No. | Percent by weight calcium chloride | η inh |
|---|---|---|
| IVa | 12 | 2.85 |
| IVb | 15 | 3.75 |
| IVc | 18 | 4.00 |
| IVd | 21 | 3.85 |

EXAMPLE V

Use was made of the method described in Example I, except that the reaction medium contained 18 g (9 percent by weight) of N,N-dimethylaniline as well as 200 g of N-methyl pyrrolidone and 24 g of calcium chloride. The inherent viscosity of the resulting poly-p-phenyleneterephthalamide was 5.27. Repeating this run yielded a product having an inherent viscosity of 4.53. For comparison, runs were made under equal conditions. However, instead of N,N-dimethylaniline there was added as acid binder an equivalent amount of calcium oxide, pyrridine, N-methylmorpholine, triethylamine, N-methylaniline or N,N-diethylaniline.

The inherent viscosities of the resulting poly-p-phenyleneterephthalamides were in these cases 1.97, 3.09, 1.96, 1.58, 0.06, and 4.00, respectively.

EXAMPLE VI

A mixer having a capacity of 160 liters, equipped with a stirrer having a speed of up to 175 r.p.m. and a cross beater mill with a speed up to 1500 r.p.m., and a cooling device was used as a reactor. Into this apparatus there were introduced 40 kg of distilled N-methyl pyrrolidone to which there were added 4.9 kg of calcium chloride. The calcium chloride had been ground previously and subsequently dried under vacuum at 200° C. For 3 hours the N-methyl pyrrolidone and the calcium chloride were intermixed. The calcium chloride was partly in solution and partly in the suspended state. The temperature of the mixture rose to 30° C.

Subsequently, 1343 g of ground p-phenylene diamine were brought into the reactor through an open top gate. The dissolving of the diamine took half an hour.

Next, the contents of the reactor were cooled to 20° C., with stirring. Then 2527 g of ground terephthaloyl dichloride (0.5% excess) were added over a period of 15 seconds. From the moment the adding of the terephthaloyl dichloride was started, the contents of the reactor were cooled with a glycol-water mixture of about −17° C.

After 10 minutes from the moment the adding of the terephthaloyl dichloride was started the stirring speed was decreased. The reactor was discharged after 17 hours and the reaction product coagulated with water, washed and dried. The water content of the calcium chloride and the N-methyl pyrrolidone used was 0.2 and less than 0.001 percent by weight, respectively.

The purity of the p-phenylene diamine and the terephthaloyl dichloride used was 99.35 and 99.65 percent by weight, respectively. The inherent viscosity of the resulting poly-p-phenyleneterephthalamide was 5.33. Samples taken 10 and 45 minutes after the terephthaloyl dichloride had been added had an inherent viscosity of 4.99 and 5.40, respectively.

Although the invention is described in detail for the purpose of illustration, it is to be understood that such detail is solely for that purpose and that variations can be made therein by those skilled in the art without departing from the spirit and scope of the invention except as it may be limited by the claims.

We claim:

1. A process for making poly-p-phenyleneterephthalamide having an inherent viscosity of at least 2.5 which is suitable for the manufacture of shaped articles by spinning or the like which comprises vigorously mixing and reacting p-phenylene diamine with terephthaloyl chloride in a substantially anhydrous solvent containing N-methyl pyrrolidone and at least 5% by weight of substantially anhydrous calcium chloride based on the weight of the N-methyl pyrrolidone, the weight of calcium chloride in the solvent when the two reactants are mixed together being such that some solid calcium chloride is suspended in the reaction mixture, and separating the resulting poly-p-phenyleneterephthalamide from the solvent, said reaction mixture being free from hexamethylphosphoramide, the inherent viscosity $\eta_{inh}$ of the poly-p-phenyleneterephthalamide being defined as $$\eta_{inh} = (\ln \eta rel/0.5)$$

where $\eta_{rel}$ is the ratio of the efflux times of a 0.5 g solution of said poly-p-phenyleneterephthalamide in 100 ml of 96 percent by weight sulphuric acid, and the pure solvent, measured in a capillary viscometer at 25° C.

2. A process for making a poly-p-phenyleneterephthalamide polymer capable of being spun which comprises vigorously mixing and reacting p-phenylene diamine and terephthaloyl chloride in a substantially anhydrous N-methyl pyrrolidone solvent which is free from hexamethylphosphoramide and which contains at least 5 percent by weight of substantially anhydrous calcium chloride based on the weight of N-methyl pyrrolidone until said polymer having an inherent viscosity of at least 2.5 is formed, and separating the resulting poly-p-phenyleneterephthalamide polymer from said solvent, the said inherent viscosity being defined as $$\eta_{inh} = (\ln \eta rel/0.5)$$

where $\eta_{rel}$ is the ratio between the efflux time of a 0.5 g solution of poly-p-phenyleneterephthalamide polymer in 100 ml of 96 percent by weight sulfuric acid, and the pure solvent, measured in a capillary viscometer at 25° C.

3. A process according to claim 2, characterized in that the reaction is carried out in a mixture of N-methyl pyrrolidone and calcium chloride, in which at the beginning of the reaction the calcium chloride is partly present as a solid phase.

4. A process according to claim 2, characterized in that the reaction is carried out in a mixture of N-methyl pyrrolidone and 8 to 24 percent by weight of calcium chloride.

5. A process according to claim 2, characterized in that the weight ratio between the N-methyl pyrrolidone and the reactants is so chosen that at the end of the reaction there is present 7 to 20 percent by weight of poly-p-phenyleneterephthalamide, calculated on the N-methyl pyrrolidone.

6. A process according to claim 2, characterized in that the weight ratio between the N-methyl pyrrolidone and the reactants is so chosen that at the end of the reaction there is present 8 to 12 percent by weight of poly-p-phenyleneterephthalamide, calculated on the N-methyl pyrrolidone.

7. A process according to claim 2, characterized in that the amount by weight of the calcium chloride used is at least equal to the amount by weight of the poly-p-phenyleneterephthalamide formed.

8. A process according to claim 2, characterized in that the reaction is carried out in a mixture which also contains 5 to 25 percent by weight of N,N-dimethylaniline based on the weight of the N-methyl pyrrolidone.

9. A process according to claim 8, characterized in that it is carried out in the presence of an amount of N,N-dimethylaniline which is at least equivalent to the amount of hydrochloric acid formed in the reaction.

10. A process for the preparation of poly-p-phenyleneterephthalamide which comprises reacting p-phenylene diamine with terephthaloyl chloride under substantially anhydrous conditions with vigorous mixing in an N-methyl pyrrolidone solvent free from hexamethylphosphoramide and containing at least 5 percent by weight of substantially anhydrous calcium chloride based on the weight of the N-methyl pyrrolidone, until a polymer capable of being spun and having an inherent viscosity of at least 2.5 is formed, the inherent viscosity being defined as in claim 2.

11. In a process for making a poly-p-phenylene polymer wherein p-phenylene diamine and terephthaloyl chloride are reacted in a solvent for the reactants, the improvement which comprises vigorously mixing and reacting the said reactants in a substantially anhydrous N-methyl pyrrolidone solvent which is free from hexamethylphosphoramide and which contains, in order to produce a polymer capable of being spun and having an inherent viscosity of at least 2.5, at least 5 percent by weight based on the weight of the N-methyl pyrrolidone of substantially anhydrous calcium chloride, continuing the reaction until said polymer of said inherent viscosity is formed, and separating the resulting polymer from the solvent, the inherent viscosity being defined as in claim 2.

12. Poly-p-phenyleneterephthalamide capable of being spun, and having an inherent viscosity of at least 2.5 and being free of hexamethylphosphoramide, made by the process of claim 11.

* * * * *